United States Patent [19]
Davis et al.

[11] Patent Number: 5,278,679
[45] Date of Patent: Jan. 11, 1994

[54] SUB-DIFFRACTION LIMITED FOCUSING LENSES

[76] Inventors: Jeffrey A. Davis, 4325 Beverly Dr., La Mesa, Calif. 91941; Don M. Cottrell, 5111 Manhasset Dr., San Diego, Calif. 92115

[21] Appl. No.: 924,221

[22] Filed: Aug. 3, 1992

[51] Int. Cl.$^5$ .......................... G02B 5/18; G02B 5/32; G02B 27/42; G02B 27/44

[52] U.S. Cl. ........................................ 359/19; 359/20; 359/565; 359/569

[58] Field of Search ................ 359/20, 562, 565, 566, 359/569, 573, 575, 15, 19, 25, 564

[56] References Cited

U.S. PATENT DOCUMENTS

| | | | |
|---|---|---|---|
| 3,637,307 | 1/1972 | Spitz | 359/20 |
| 3,658,403 | 4/1972 | Greenaway et al. | 359/20 |
| 3,700,902 | 10/1972 | Buchan . | |
| 3,837,725 | 9/1974 | Bricot et al. | 359/20 |
| 4,649,351 | 3/1987 | Veldkamp et al. | 359/562 |
| 5,073,007 | 12/1991 | Kedmi et al. . | |
| 5,113,286 | 5/1992 | Morrison | 359/569 |

OTHER PUBLICATIONS

Dammann et al, "High Efficiency In-Line Multiple Imaging By Means Of Multiple Phase Holograms," Optics Communications, vol. 3, No. 5, Jul. 1971, pp. 312 to 315.
Hecht, Eugene, Optics, Second Edition, pp. 416–421, 1988, Addison-Wesley.
Hecht, Eugene, Optics, Second Edition, pp. 445–447, 1988, Addison-Wesley.
Yariv, Amnon, Optical Electronics, Fourth Edition, p. 42, 1991, Saunders College Publishing.
Klein, Miles, V., Optics, pp. 355–388, 1970, John Wiley and Sons, Inc., New York.
Veldkamp, Wilfrid et al., "Binary Optics", Scientific American, May, 1992, pp. 92–97.
Carts, Yvonne A., "Microelectronic Methods Push Binary Optics Frontiers", Laser Focus World, Feb. 1992, pp. 87–95.
Faklis, Dean et al, "Diffraction Lenses in Broadband Optical System Design", Photonics Spectra, Dec. 1991, pp. 131–134.
Swanson, Gary et al, "Diffractive Optical Elements for Use in Infrared Systems", Optical Engineering, Jun. 1989, vol. 28, No. 6, pp. 605–608.
Hasman, E. et al, "Efficient Multilevel Phase Holograms for CO2 Lasers", Physics Letters, vol. 16, No. 6, Mar. 15, 1991, pp. 423–425.
Stone, Thomas et al, "Hybrid Diffractive-Refractive Lenses and Achromats", Applied Optics, vol. 27, No. 14, Jul. 15, 1988, pp. 2960–2971.
Levy, Uri, "Diffractive Optics Spawns New Products and a Multimillion-Dollar Market", Photonics Spectra, May 1992, pp. 135–140.
Miller, Carl, "Semiconductor Processing Benefits From Small Spot Size", Laser Focus World, Jun. 1992, pp. 91–96.
Vinas, Salvador et al., "Zone Plates With Black Focal Spots", Applied Optics, vol. 31, No. 2, Jan. 10, 1992, pp. 192–198.
Davis, Jeff et al, "Spatial Image Differentiation Using Programmable Binary Optical Elements", Applied Optics, vol. 30, No. 32, Nov. 10, 1991, pp. 4610–4614.
Davis, Jeff et al, "Programmable Optical Interconnections With Large Fan-Out Capability Using the Magneto-Optic Spatial Light Modulator", Optics Letters, vol. 14, No. 1, Jan 1, 1989, pp. 102–104.
Psaltis, Demetri, "Optical Image Correlation With a Binary Spatial Light Modulator", Optical Engineering, vol. 23, No. 6, Nov./Dec., 1984, pp. 698–704.

Primary Examiner—Martin Lerner
Attorney, Agent, or Firm—Lyon & Lyon

[57] ABSTRACT

This invention relates to the fabrication of lenses which can focus a light beam to a spot size which is smaller than that allowed by diffraction theory. A composite lens function is constructed using a strong centered lens function and several additional lens functions having different weights, different separation distances from the center, and different phases. The focused spot consists of the vector sum of these differently weighted electric fields from the separate lens functions. By varying the separation distances, the weights, and the phases of the additional lens functions, the vector sum of the electric fields from the lens functions produces a focused spot whose width is less than the diffracted limited spot size. Such composite lens functions can be produced, for example, using diffractive optics techniques or by programming the lens function onto a spatial light modulator.

12 Claims, 6 Drawing Sheets

SUB-DIFFRACTION LIMITED FOCUSING LENSES

FIELD OF THE INVENTION

This invention relates to diffractive lenses and the fabrication of diffractive lenses which can focus a light beam to a spot size which is smaller than that allowed by diffraction theory.

BACKGROUND

Optical lenses are used to focus a beam of light. However the size of the focused spot is limited from diffraction theory. One such equation, which is discussed by E. Hecht in "Optics", (Addison-Wesley, Mass., 1988), gives the diameter d of the focused spot by the equation $$d = 1.22 \frac{f\lambda}{D} \tag{1}$$

where $\lambda$ is the wavelength of the light, and f is the focal length of the lens. Here D usually represents the diameter of the lens assuming that the lens is completely illuminated. Otherwise it represents the diameter of the optical beam if it is smaller than the lens. FIG. 1A shows the formation of a diffraction limited spot by a lens.

There are many applications in which a very small focused spot size is desired such as in photolithography, in making high density computer memory chips, in laser machining where high energy densities are desired, and in the reading and writing of compact discs where smaller spot sizes mean longer playing times and higher memory content. According to Eq. (1), three ways of decreasing the spot size are to use shorter wavelengths, shorter focal lengths, or larger diameters. However diffraction theory places a limit on that size.

In order to focus the light, the phase of the incident optical beam $\phi(x,y)$ must be altered as a function of x and y. This phase function is discussed by A. Yariv in "Introduction to Optical Electronics", (Holt, Rinehart, and Winston, N.Y., 1991) and is given, using small angle approximation theory, by $$e^{i\phi(x,y)} = e^{ik(\frac{x^2+y^2}{2f})} \tag{2}$$

where f is the focal length of the lens and $k=2\pi/\lambda$.

More complicated aspheric phase functions are required to obtain the diffraction limited size for the focused spot size as known to those skilled in the art. Some of these are discussed by Kedmi et. al. in U.S. Pat. No. 5,073,007 titled "Diffractive optical element". Lens functions can operate either in transmission as with conventional glass lenses, or in reflection as in the case of focusing mirrors.

For purposes of this Specification, the term "lens function" is defined as a phase and/or amplitude function and which operates either in a reflection or transmission mode.

The phase shift of light traveling through a medium of thickness d is related to $$\phi = \frac{2\pi n d}{\lambda} \tag{3}$$

where n is the index of refraction of the medium. This phase can be encoded by varying the index of refraction or the thickness of the material.

The phase function can be encoded to form a lens using several techniques as known to those skilled in the art. The first is refraction and involves the bending of light as it passes through an interface between two different materials such as glass and air. By making a curved glass element as shown in FIG. 1A, different rays of light will be bent by different amounts as they pass through the lens. The phase function is controlled by varying the thickness of the glass lens. By making the glass surfaces with the correct shapes, diffraction limited lenses can be manufactured. These lenses are called refractive optical elements and are the most common lenses available.

A second technique known in the prior art involves diffraction. This approach uses the well known diffraction formula $m\lambda = p\sin\theta$ where m is the order, $\lambda$ is the wavelength, p is the grating spacing and $\theta$ is the angle from normal to the grating. If the grating spacing p varies with distance r from the axis in the correct manner as discussed by E. Hecht in "Optics", (Addison-Wesley, Mass., 1988), then the diffraction angle will vary also as shown in FIG. 1B, again forming a focused spot. These lenses are called diffractive optical elements. Examples of such lenses are Fresnel lenses, binary optical elements, and holographic optical elements.

In making Fresnel lenses, the phase function forming the diffraction grating can be encoded using a variety of techniques. A discussion of these techniques can be found in several articles in "Proceedings of SPIE", Volume 1052, (1989).

These encoding techniques can be understood using the Euler relation where $\phi(x,y)$ is given by Eq. (2), as $$e^{i\phi(x,y)} = \cos(\phi(x,y)) + i\sin(\phi(x,y)) \tag{4}$$

Here the real part is given by $\cos(\phi(x,y))$ and the imaginary part by $\sin(\phi(x,y))$. The phase function can be encoded by examining the entire phase function, or only its real or imaginary part.

Some representative phase encoding techniques for making diffractive optical elements or binary optical elements include:

1. Making the grating with adjacent transparent and opaque circular regions. This pattern can be described as a zone plate with alternating transparent regions as discussed by M. V. Klein in "Optics" (J. Wiley and Sons, New York, 1970). In this approach, the phase function is made using a computer program. In one example the phase function is made equal to +1 whenever the Real part of the complex function shown in Eq. (4) is positive. When the Real part of the complex function shown in Eq. (4) is negative or zero, the phase function is made equal to 0.

2. Making the grating with adjacent regions in which the phase of the transmission differs by $\pi$ radians from one region to another. This pattern is referred to as a binary phase-only filter (BPOF). In this approach, the phase function is made using a computer program as discussed by D. Psaltis et. al. in "Optical image correlation with a binary spatial light modulator" published in Optical Engineering, vol 23, p 698-704, Nov/Dec. (1984). In one example whenever the Real part of the complex function shown in Eq. (4) is positive, the phase function is made equal to +1. When the Real part of the complex function shown in Eq. (4) is negative or zero, the phase function is made equal to −1.

3. Using holographic techniques to encode the phase function as discussed by M. Feldman and C. Guest in the article titled "Computer generated holographic optical elements for optical interconnection of very large scale integrated circuits" published in Applied Optics, vol 26, p 4377–4384, (1987).

4. Using photolithography or a ultraviolet laser writer combined with reactive ion etching to selectively vary the thickness of the optical element to encode the required phase function as discussed by Y. Carts in the article titled "Microelectronic methods push binary optics frontiers" published in Laser Focus World, p. 87–95, February (1992).

5. Using direct e-beam writing to selectively vary the thickness of the optical element to encode the required phase function as discussed by Y. Carts in the article titled "Microelectronic methods push binary optics frontiers" published in Laser Focus World, p. 87–95, February (1992).

6. Using diamond turning to selectively cut the surface of the optical element to encode the required phase function as discussed by Y. Carts in the article titled "Microelectronic methods push binary optics frontiers" published in Laser Focus World, p. 87–95, February (1992).

7. Using an ion exchange process to selectively vary the phase profile of a material by varying the index of refraction of the material as a function of position as discussed by H. Bolstad et. al. in the article titled "Optimization of phase-only computer generated holograms using an ion-exchange process" published in Optical Engineering, vol 31, p. 1259–1263, (1992).

8. Using replication techniques in which a master surface-engineered diffractive optical element is first produced using techniques such as discussed above. Then replica copies can be made by impressing the surface relief pattern onto another material including a variety of plastic materials as discussed by Y. Carts in the article titled "Microelectronic methods push binary optics frontiers" published in Laser Focus World, p. 87–95, February (1992).

Optical elements can also be made using a combination of refractive and diffractive techniques. This approach offers several advantages including correction of chromatic aberrations as discussed by T. Stone et. al. in the article titled "Hybrid diffractive-refractive lenses and achromats" and published in Applied Optics, vol 27, p 2960–2971, (1988).

Finally, optical elements can be made encoding the desired phase function onto programmable recording media including spatial light modulators (SLMs). Some of the devices which are well known to those in the field include the magneto-optic spatial light modulator (MOSLM), liquid crystal light valve (LCLV), liquid crystal television (LCTV), and deformable mirror device (DMD). These modulators can allow encoding of pure amplitude information, a binary phase pattern, a pure phase-only function, or combinations of amplitude and phase information. FIG. 1C shows the formation of a focused spot by diffractive optical elements which has been encoded onto a SLM.

Diffractive optical elements can offer more design freedom than refractive optical elements since the phase distribution can be varied more easily allowing the construction of more complicated optical elements.

Nevertheless, despite the longstanding goal of obtaining a subdiffraction limited focused beam, the problem remains unsolved.

SUMMARY OF THE INVENTION

The technique and apparatus of this invention involves encoding phase information onto an optical element to create a focused spot size which is smaller than the diffraction limit. This invention is based on the combination of several principles.

First, the location of the focused spot of light depends on the location of the lens. If the lens is moved in a direction perpendicular to the axis along which the optical beam propagates, the location of the focused spot shifts accordingly as shown in FIG. 1D.

Next, the principle of interference says that the electric field produced at a point in space by several different sources is equal to the vector sum of the individual electric fields from these sources. The total optical intensity is given by the product of the sum of the electric fields with its complex conjugate. Interference can be obtained by forming a composite optical element which is constructed using several lenses having different spatial positions and which forms images which overlap in space.

The degree of the interference depends on the relative phase shift between each of the individual electric fields at the point in space and may be varied by changing the relative phase shift between the lens functions.

The final principle is that the relative strength of the electric field from each lens function can be changed by varying the weight or strength of the individual lens functions which form the composite lens function.

There is therefore provided, in accordance with a preferred embodiment of the present invention, an optical element designed to obtain a subdiffraction limited focused spot. This optical element is formed, for example, using a phase function equivalent to three lens functions having different weights and which are shifted laterally relative to each other. The shift between the lens functions is small enough so that a portion of the focused spots overlap. In addition for this example, the outer lens functions have a phase shift of $\pi$ radians relative to the center lens function.

The electric field produced by these lenses consists of the interference between a strong centered electric field and weaker and shifted electric fields which have a phase shift of $\pi$ radians. The resultant electric field will be the vector sum of these three electric fields.

By adjusting the amplitudes and positions of the three lens functions, the vector sum of the electric fields can be made narrower than the original electric field from any of the three individual lens functions. The resulting intensity pattern consists of a focused spot whose dimensions are smaller than the original diffraction limited focused spot.

Such optical elements can be produced, for example, with diffractive optics techniques by encoding the phase function which is applicable to the sum of the individual lens functions having different weights, phases, and center locations.

One object of this invention relates to encoding a Fresnel lens pattern which results in a focused spot size which is smaller than the diffracted limit in one dimension when the lenses are shifted in the same direction.

Another object of this invention involves the encoding of multiple lenses with different amplitudes and phases and which have different shift distances relative to the original lenses. All of the lenses are shifted along the same axis. In this case, sidelobes which are produced by the interference between the original three electric field distributions can be reduced resulting in a narrower beam.

Another object of this invention involves the use of multiple lenses having different amplitudes and phases which are shifted in various directions relative to the central lens in order to produce smaller spot sizes having circular or elliptical symmetry.

Another object of this invention relates to the encoding of any of the above patterns onto a programmable spatial light modulator.

In the preferred embodiment, the overall apparatus would be as follows. Collimated light is incident upon a substrate or a spatial light modulator containing the encoded phase pattern. This phase pattern is generated using a computer and the resulting phase information is encoded onto a material using a variety of techniques known to those skilled in the art including etching the thickness of the material. The desired shape of the focused spot is formed at the focal point of the optical element.

In accordance with the teachings of this invention, a principal application is in forming a spot size whose dimensions are smaller than the diffraction limited spot size. This spot size can be reduced in any single direction or symmetrically compared with the original spot size shape. The focal lengths for the lens can be different or identical for the horizontal and vertical axes.

Another object of this invention is to encode the phase functions onto SLMs in order to vary either the shape and/or location of the focused spot.

DETAILED DESCRIPTION

Figure 1A:
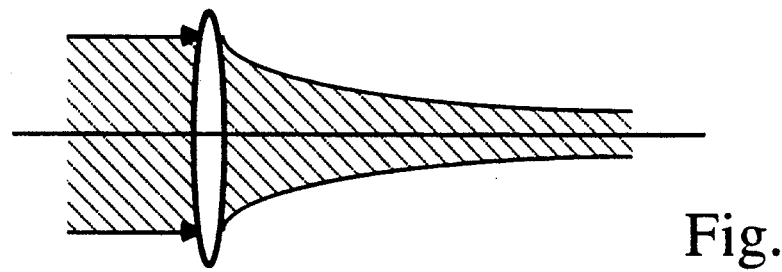
FIG. 1A shows the focusing of a light beam by a refractive lens
Figure 1B:
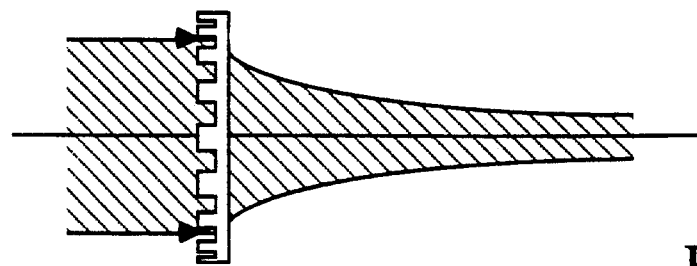
FIG. 1B shows the focusing of a light beam by a diffractive lens
Figure 1C:
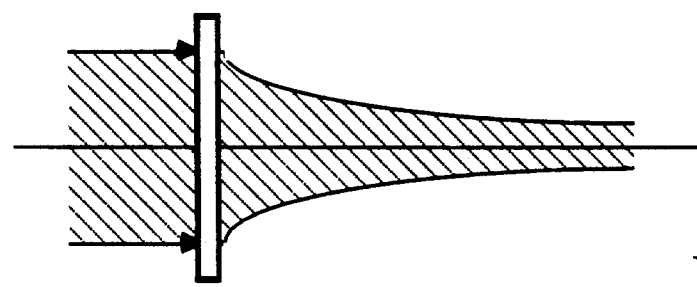
FIG. 1C shows the focusing of a light beam by a diffractive lens which is written onto a spatial light modulator.

An optical element, such as a lens, can focus a collimated light beam as shown in FIG. 1A. However the size of the focused spot is limited from diffraction theory. One such equation, which is discussed by E. Hecht in "Optics", (Addison-Wesley, Massachusetts, 1988) gives the diameter d of the focused spot by the equation $$d = 1.22 \frac{f\lambda}{D} \tag{5}$$

where $\lambda$ is the wavelength of the light, and f is the focal length of the lens. Here D represents the diameter of the lens assuming that the lens is completely illuminated. The actual spot size of the focused beam may be larger than this limit depending upon the quality of the phase function which is encoded onto the lens.

In many applications such as in photolithography, in manufacturing high density computer memory chips and in the reading and writing of compact discs, a very small focused spot size is desired to obtain increased resolution. A narrow spot size is required for use of a laser beam for alignment purposes. A narrow spot size also increases the energy density for use in laser machining applications. However diffraction theory places a limit on that size. This patent application addresses a technique and method for making an optical element to produce a focused spot size whose dimensions are smaller than the diffraction limited spot size and uses several concepts.

Figure 1D:
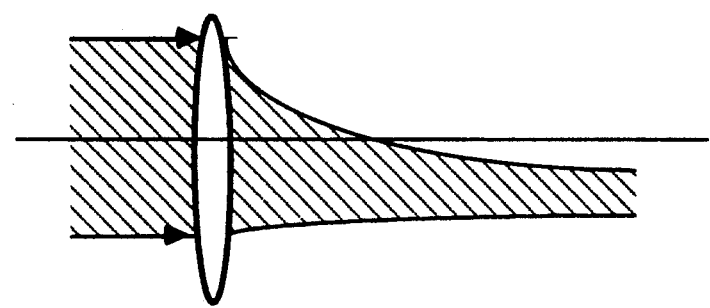
FIG. 1D shows the location of the focused spot changing by moving the center location of the focusing lens.

The first is that the location of the focused spot of light depends on the location of the lens. If the lens is moved in a direction perpendicular to the axis along which the optical beam propagates, the location of the focused spot shifts accordingly as shown in FIG. 1D.

The second concept is the principle of interference which says that the electric field produced at a point in space jointly by several different sources is equal to the vector sum of the individual electric fields from these sources. The subsequent optical intensity is given by the product of the vector sum of the electric fields multiplied by its complex conjugate.

The extent of the interference depends on the relative phase shift between each of the individual electric fields at the point in space and may be varied by changing the relative phase shift between the lenses.

Figure 2A:
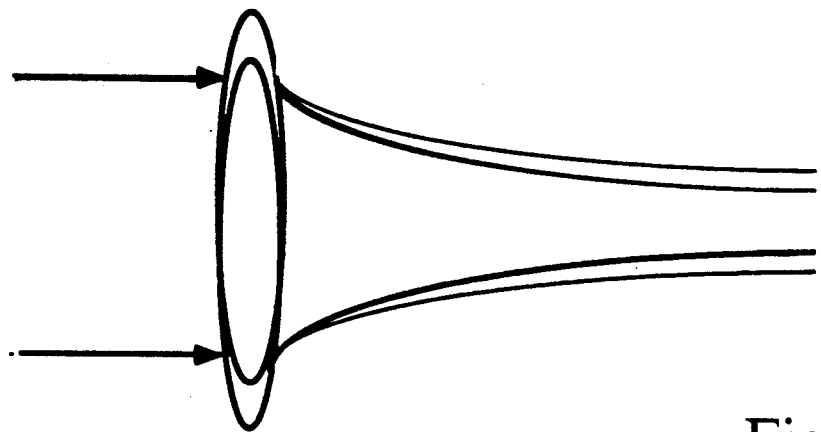
FIG. 2A shows the focusing of a light beam by two shifted lenses
Figure 2B:
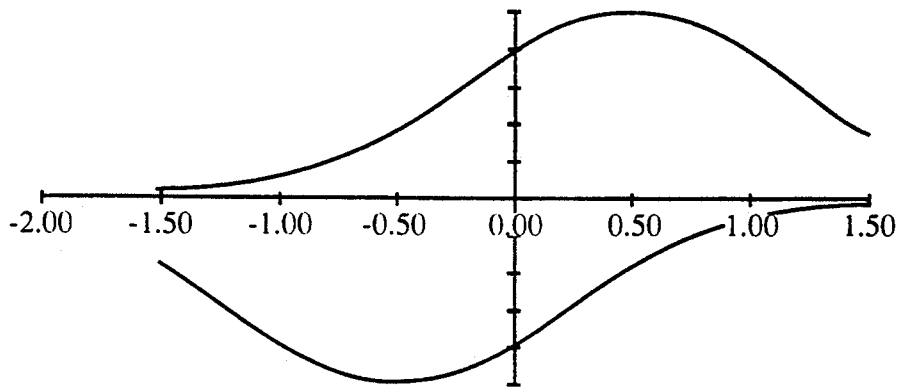
FIG. 2B shows a representative drawing of the electric fields produced by two shifted lenses in which one has a phase shift of $\pi$ radians.
Figure 2C:
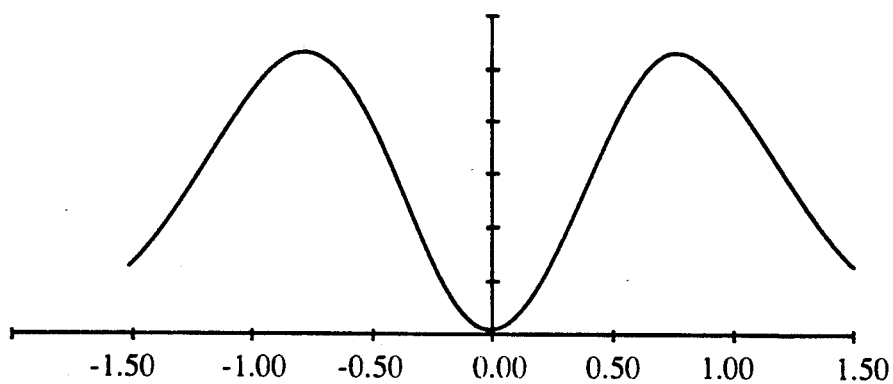
FIG. 2C shows a representative drawing of the intensity distribution from the lenses shown in FIG. 2A.

In the first embodiment of the technique, a composite lens function is constructed using two lenses which were slightly shifted laterally with respect to one another as shown in FIG. 2A. Each lens forms an image having a different spatial location. However the shift between the two lens functions is small enough so that a portion of the focused images overlap, causing interference. The overlap region is shown by the cross-hatched region in the figure. By introducing a relative phase shift of $\pi$ radians between the two lens functions, the electric fields produced by each lens will subtract in the region where they overlap as shown in FIG. 2B. The resultant electric field will be the vector sum of these two electric fields and will yield an intensity pattern consisting of a dark area surrounded by two bright areas.

This new class of optical elements was reported by J. A. Davis et. al. in the article titled "Spatial image differentiation using programmable binary optical elements", published in Applied Optics, vol 30, p. 4610–4614 (November 1991).

Such optical elements can be produced with diffractive optics techniques by encoding the more complicated phase function (assuming the spherical wave approximation) given by $$e^{i\phi(x,y)} = e^{ik(\frac{(x-a)^2+y^2}{2f})} - e^{ik(\frac{(x+a)^2+y^2}{2f})} \quad (6)$$

where the center locations of the two lens functions are located a distance "2a" apart.

Figure 3A:
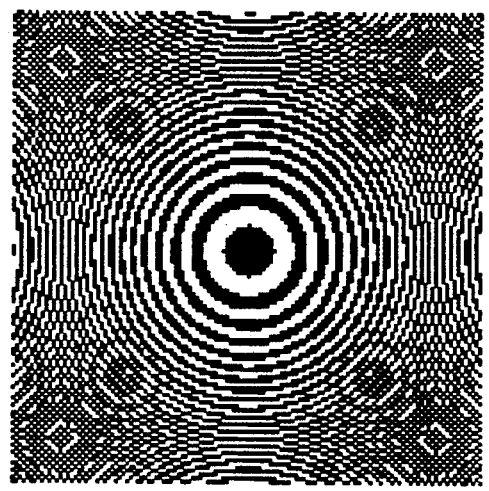
FIG. 3A shows the binary representation for the phase function for a conventional diffractive lens given by Eq. (2).
Figure 3B:
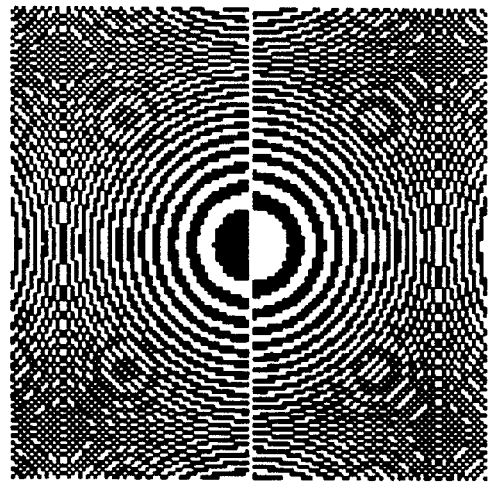
FIG. 3B shows the binary representation for the phase function for a split lens given by Eq. (5).

FIG. 3A shows a binary representation of the conventional Fresnel lens phase function given by Eq. (2) while FIG. 3B shows the binary representation of a phase function equivalent to two shifted lenses with a $\pi$ phase shift as given by Eq. (6).

A similar approach was later published independently by S. B. Vinas et. al. in the article titled "Zone plates with black focal spots", in Applied Optics, vol 31, p. 192–198, (January, 1992). Their work resulted in a focused dark spot whose dimensions were smaller than the diffraction limit.

The diffractive optics elements produced by both groups were very similar. Davis et. al. formed their lens onto a spatial light modulator while Vinas et. al. encoded their lens as a zone plate.

However this approach does not yield a subdiffraction limited bright spot as needed in these applications.

These principles are next combined with another principle in which the strength of the electric field produced by each lens function can be modified by changing the strength or weight of each lens function which forms the composite lens function.

Figure 4A:
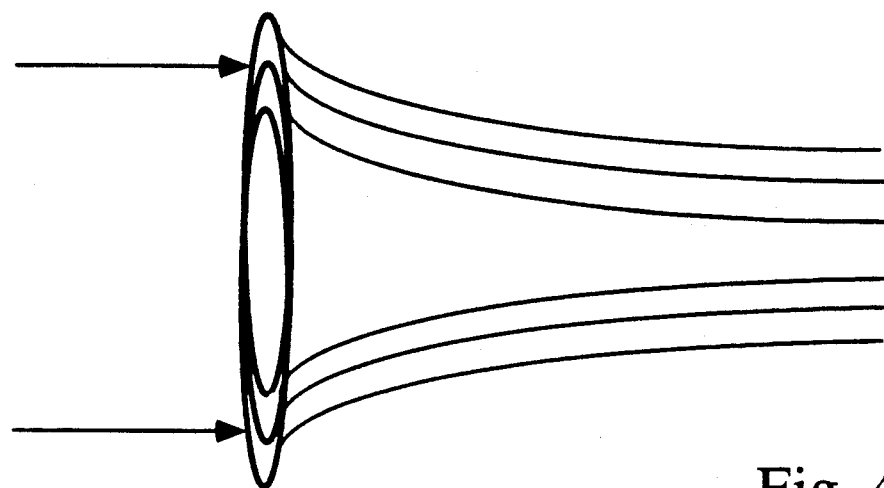
FIG. 4A shows the focusing of a light beam by three shifted lenses

In another embodiment of the technique, a diffractive optical element is formed using a phase function equivalent to three lens functions having different weights and which are shifted laterally relative to each other as shown in FIG. 4A. The shift between the lens functions is small enough so that portions of the focused spots overlap. In addition, the phases of the two outer lenses are shifted by $\pi$ radians relative to the center lens.

Figure 4B:
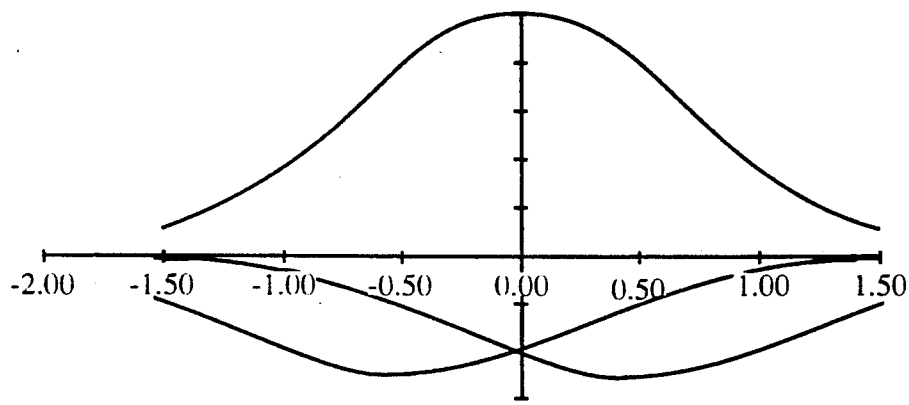
FIG. 4B shows a representative drawing of the electric fields produced by three shifted lenses in which the outer two have a phase shift of $\pi$ radians.

The electric field produced by these three lens functions consists of two shifted electric fields with one amplitude and a centered electric field with a different weight and a relative phase shift of $\pi$ radians as shown schematically in FIG. 4B. The resultant electric field will be the vector sum of these three electric fields.

By adjusting the amplitudes, positions and relative phase shifts of the three lens functions, the vector sum of the electric fields can be made narrower than the original electric field from any of the three individual lens functions. The resulting intensity pattern consists of a focused spot whose dimensions are smaller than the original diffraction limited beam as shown schematically in FIG. 4C. Note however than the dimension of the final spot is only reduced in the direction parallel to the direction in which the lenses are shifted.

Such an optical element can be produced with diffractive optics techniques by encoding a phase function (assuming the spherical wave approximation) given by $$e^{i\phi(x,y)} = A e^{ik(\frac{x^2+y^2}{2f})} - B e^{ik(\frac{(x-a)^2+y^2}{2f})} - B e^{ik(\frac{(x+a)^2+y^2}{2f})} \quad (7)$$

where A and B represent the relative weights of the lens functions and the two outer lens functions are each shifted by a distance "a" relative to the center lens function.

Figure 5:
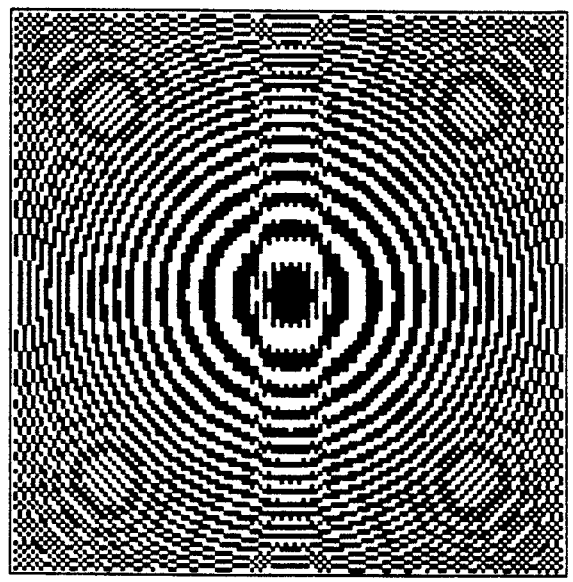
FIG. 5 shows the binary representation for the phase function for a three lens combination as given by Eq. (7).

FIG. 5 shows a binary representation of a phase function equivalent to a center lens function having an amplitude of 1 and two lens functions each shifted by a distance d/2 with an amplitude of 0.5 and a $\pi$ phase shift as given by Eq. (7).

In another embodiment of the technique, a larger number of lens functions can be encoded each having different amplitudes and phases and which have been shifted in a variety of directions by different shift distances relative to the original lens function.

Figure 4C:
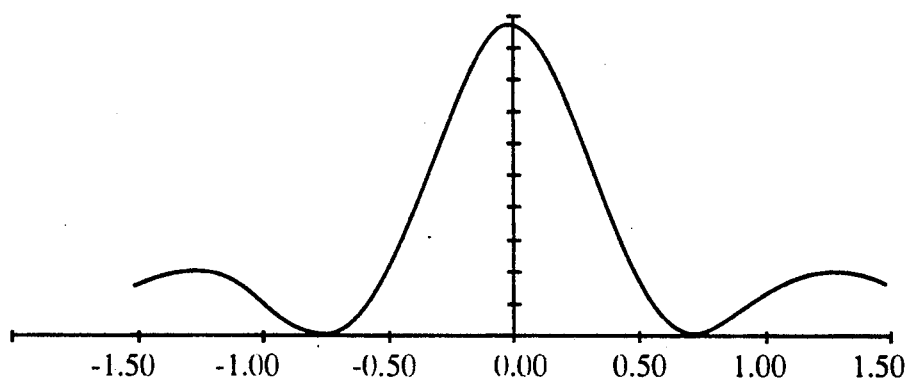
FIG. 4C shows a representative drawing of the intensity distribution from the lenses shown in FIG. 4A. The width of the spot is smaller than the diffraction limit.

If multiple lens functions are shifted along the same axis, sidelobes which are produced by the interference between the original three electric field distributions as shown in FIG. 4C can be reduced. These sidelobes are produced at the outer edges since the electric fields from the three lens functions do not completely cancel each other. When additional lens functions are added with appropriate strengths and relative phase shifts, these sidelobes can be reduced.

In another application, these sidelobes may prove useful. In the reading of compact discs (CD's), the laser beam is focused at three locations. The outer two beams are used for tracking control while the center beam is used to read the pattern encoded onto the CD. In this application of the invention, each of the focused spots (the central beam and the sidelobes) have widths which are less than the diffraction limit. Therefore the sizes of the three patterns encoded onto the CD can be made smaller, increasing the information capacity of the CD.

If the multiple lens functions are shifted in various directions relative to the central lens function, smaller spot sizes can be produced having circular symmetry. For example, the lens function can be constructed with a central lens function and four shifted lens functions arranged on a square pattern relative to the central lens function. This arrangement can produce a circular spot whose dimensions are smaller than the diffraction limit. More complicated functions can also be created using additional lens functions with different phase shifts which can cancel sidelobes.

Another aspect of this invention involves the use of different relative phase shifts between the various lens functions allowing for various amounts of constructive and destructive interference between the electric field patterns. In the examples given above, the relative phase shifts were always either 0 or $\pi$ radians. However different phase shifts can be incorporated to reduce the degree of destructive interference.

The most general phase distribution which includes all of the above possibilities could be written as $$e^{i\phi(x,y)} = \sum_{i=0}^{N} A_i e^{ik(\frac{(x-x_i)^2}{2f_x})} e^{ik(\frac{(y-y_i)^2}{2f_y})} ) e^{i\phi_i} \quad (8)$$

In this equation, the amplitudes of the various lens functions are given by $A_i$, the center locations of the lens functions are given by the values of $x_i$ and $y_i$ in the x and y directions and the relative phase shifts of the lens functions are given by $\phi_i$. In addition, we allow for the fact that the focal length in the x direction given by $f_x$ can be different than the focal length in the y direction given by $f_y$.

While the technique of this invention is usable with permanent, non-programmable masks, it is particularly useful for programmable masks. One particularly useful programmable mask is a class of devices denominated as SLMs. This invention has been implemented with a magneto-optic spatial light modulator. MOSLMs are available, for example, from Semetex Corporation. A MOSLM consists of a two dimensional array of individually addressable pixels whose magnetization state can be altered. The plane of polarization for linearly polarized light incident on a pixel will be rotated either clockwise or counterclockwise depending on the magnetization state of the pixel. If the analyzer polarizer is placed parallel to the incident plane of polarization, the output will consist of polarization states which are out of phase by $\pi$ radians. Therefore binary phase-only patterns can be imposed on the device for which the value of the phase function is made equal to $+1$ if it is positive and $-1$ if it is negative.

While the MOSLM is only capable of recording binarized information, the invention is applicable to other recording media or SLMs which permit the recording of either binary or continuous information. Such recording media or SLMs which are well known to those in the field include photographic film, thermoplastic films, liquid crystal light valve (LCLV), liquid crystal television (LCTV), and deformable mirror device (DMD) for example.

In another aspect of this invention, any or all of the above patterns can be encoded as known to those skilled in the art onto a programmable spatial light modulator allowing the shape and location of the focused spot to be changed as was done by J. A. Davis et. al. in the article titled "Spatial image differentiation using programmable binary optical elements", published in Applied Optics, vol 30, p. 4610-4614 (November 1991). For example, the size of the spot can be made smaller in the horizontal or vertical directions, or can be made symmetrically smaller than the diffracted limit.

In the preferred embodiment, the overall apparatus would be as follows. Collimated light is incident upon a substrate or a spatial light modulator containing the encoded lens function pattern. This pattern is generated using a computer and the resulting lens function is encoded onto the substrate using a variety of techniques known to those skilled in the art including etching the thickness of the substrate. The desired shape of the focused spot then forms at the focal point of the optical element.

In accordance with the teachings of this invention, a principal application is in forming a spot size which is smaller than the diffraction limited spot size. This spot size can be reduced in any single direction or symmetrically compared with the original spot size. The focal lengths for the lens function can be different or identical for the horizontal and vertical axes.

In one embodiment, the input beam need not be collimated. In this case, the output image will be located at the image plane of the lens function.

In another embodiment, a second optical lens may be used in conjunction with the composite lens function, either separately or included onto the optical element of this invention. Such composite diffractive-refractive lenses are well known to those skilled in the art.

While there are many practical applications of this invention, one key application relates to the formation of a focused spot whose physical dimensions are smaller than the diffraction limit.

EXPERIMENTAL VERIFICATION

Experimental verification of the approach has been obtained (using a pattern formed on the MOSLM) and shows that the dimensions of the spot size are smaller than the focused spot using the original Fresnel lens pattern.

In the experiments, light from a Helium Neon laser (Uniphase model 1105P) was expanded (using a Newport Corporation model 900 spatial filter) and collimated (using a Space Optics Research Lab model FX/15 lens). The light passed through a MOSLM (Semetex Corporation model 128×128 SightMod) having a size of 1 cm×1 cm onto which the lenses having a focal length of 1.138 meters were encoded. The focused spot was magnified (using a Melles Griot O1LDX171 lens with a focal length of 10 cm) and imaged onto a diode array detector (Reticon model RL256S).

Figure 6A:
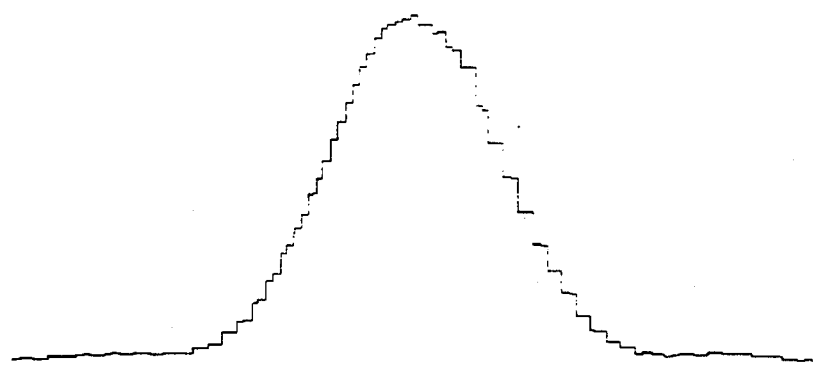
FIG. 6A shows an experimental trace of the cross section of a focused beam using a conventional lens and showing the limiting width of the focused spot.

Using a conventional Fresnel lens written onto the MOSLM, the focused spot had a diameter of 190 microns as shown in FIG. 6A. Using Eq. (1), we expected a theoretical size of 144 microns. The discrepancy is due to the fact that the MOSLM is not perfectly flat and introduces phase distortion.

Figure 6B:
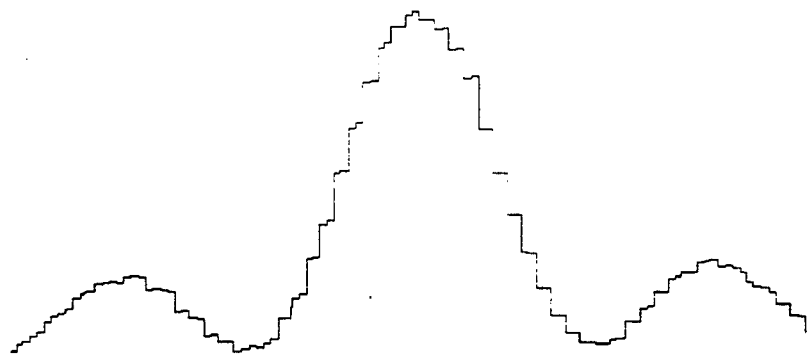
FIG. 6B shows an experimental trace of the cross section of a focused beam using the disclosed techniques of this patent. The beam width is smaller than the conventional diffraction limit.

Using the techniques described in this patent application, an optical element was constructed using a centered lens having a weight of 1 and two weaker lenses each having a strength of 0.535 and each shifted from the center by a distance of 75 microns in opposite directions. When this optical element was written onto the MOSLM, the diameter of the focused spot was decreased to a width of 95 microns as shown in FIG. 6B. This value is smaller than the value given by Eq. (1).

While the invention has been described with reference to the accompanying drawings and equations, it should not be considered as limited to the details shown therein as obvious modifications may be made to both the apparatus and method of the present invention by those of ordinary skill in the art, the invention being limited only by the claims appended hereto.

What is claimed is:

1. A method for forming a composite lens function comprising the steps of:
   generating a series of lens functions having different center locations such that portions of the imaged or focused beams overlap and
   introducing different relative phase shifts between the individual lens functions and
   multiplying each lens function by a different strength or weighting factor and
   forming a composite lens function consisting of the summation of these individual lens functions and
   encoding this composite lens function onto an optical material.

2. The method of claim 1 in which the composite lens function provides the formation of a focused spot of light having dimensions which are smaller than the diffraction limit of an optical lens.

3. The method of claim 1 wherein the center locations of the individual lens functions are displaced by different distances along a single axis.

4. The method of claim 1 wherein the composite lens function is formed using the steps of:

generating three lens functions whose center locations are displaced by different distances along a single axis in the same direction such that portions of the imaged or focused beams overlap and where the two outer lens functions have a relative phase shift of $\pi$ radians compared with the center lens function, and where the two outer lens functions are weaker than the center lens function.

5. The method of claim 1 wherein the center locations of the individual lens functions are displaced by different distances in different directions.

6. The method of claim 1 wherein the relative phase shifts between the different lens functions are zero or pi radians.

7. An optical element onto which is encoded a composite lens function formed using the steps of generating a series of lens functions having different center locations such that portions of the imaged or focused beams overlap and introducing different relative phase shifts between the individual lens functions and multiplying each lens function by a different strength or weighting factor and forming a composite lens function consisting of the summation of these individual lens functions and encoding this composite lens function onto an optical material.

8. The method of claim 7 wherein the lens function is encoded using holographic optical techniques.

9. The method of claim 7 wherein the lens function is encoded as a diffractive optical element.

10. The method of claim 7 wherein the lens function is encoded onto a spatial light modulator.

11. The method of claim 7 wherein the spatial light modulator is a magneto-optic spatial light modulator.

12. The method of claim 7 wherein the spatial light modulator is a liquid crystal spatial light modulator.

* * * * *